(12) United States Patent
Ueda et al.

(10) Patent No.: US 8,573,051 B2
(45) Date of Patent: Nov. 5, 2013

(54) FLOW RATE MEASUREMENT DEVICE HAVING AN AUXILIARY PASSAGE ARRANGEMENT THAT PREVENTS LIQUID BREAKING INTO THE DETECTION PASSAGE

(75) Inventors: Naotsugu Ueda, Kusatsu (JP); Satoshi Nozoe, Toyonaka (JP)

(73) Assignee: OMRON Corporation, Kyoto (JP)

( * ) Notice: Subject to any disclaimer, the term of this patent is extended or adjusted under 35 U.S.C. 154(b) by 375 days.

(21) Appl. No.: 13/060,548

(22) PCT Filed: Aug. 3, 2009

(86) PCT No.: PCT/JP2009/003678
§ 371 (c)(1),
(2), (4) Date: Feb. 24, 2011

(87) PCT Pub. No.: WO2010/023823
PCT Pub. Date: Mar. 4, 2010

(65) Prior Publication Data
US 2011/0146397 A1 Jun. 23, 2011

(30) Foreign Application Priority Data
Sep. 1, 2008 (JP) .................................. 2008-222992

(51) Int. Cl.
*G01F 5/00* (2006.01)
*G01F 1/68* (2006.01)

(52) U.S. Cl.
USPC ............................................ 73/202; 73/202.5

(58) Field of Classification Search
None
See application file for complete search history.

(56) References Cited

U.S. PATENT DOCUMENTS

| 5,279,155 A | 1/1994 | Johnson et al. |
| 5,363,704 A | 11/1994 | Huang |
| 7,866,208 B1 * | 1/2011 | Ueda et al. ................. 73/204.15 |
| 2009/0078039 A1 * | 3/2009 | Ueda et al. ..................... 73/202 |

FOREIGN PATENT DOCUMENTS

| CN | 101194145 A | 6/2008 |
| EP | 1 879 004 A1 | 1/2008 |
| JP | 10-54741 | 2/1998 |
| JP | 11051723 A | 2/1999 |
| JP | 2006-308518 A | 11/2006 |

(Continued)

OTHER PUBLICATIONS

Office Action Issued in Austrailian Application No. 2009285503, Dated Mar. 8, 2012 (2 Pages).

(Continued)

*Primary Examiner* — Harshad R Patel
(74) *Attorney, Agent, or Firm* — Osha Liang LLP

(57) ABSTRACT

A flow rate measurement device has a main flow pipe having a main flow passage through which a gas passes, an orifice for limiting a flow of the gas in the main flow passage, and an auxiliary flow passage block provided with an auxiliary flow passage having one end communicating with a pair of introduction ports opened in the main flow passage on the upstream side of the orifice and the other end communicating with a pair of discharge ports opened in the main flow passage on the downstream side of the orifice. The auxiliary flow passage includes a pair of introduction flow passages having upstream ends respectively communicating with the introduction ports, an upstream auxiliary flow passage having both ends respectively connected to downstream ends of the introduction flow passages, and a pair of discharge flow passages having downstream ends respectively communicating with the discharge ports.

8 Claims, 13 Drawing Sheets

(56) References Cited

FOREIGN PATENT DOCUMENTS

| JP | 3870969 B2 | 1/2007 |
|----|------------|--------|
| WO | 0161282 A2 | 8/2001 |
| WO | 2006/120848 A1 | 11/2006 |

OTHER PUBLICATIONS

Abstract of JP 2006-308518 (A), data supplied from the espacenet database—Worldwide, 1 page.

Abstract of JP 11051723 (A), Data supplied from the espacenet database—Worldwide, 1 page.

International Search Report issued in PCT/JP2009/003678, mailed on Dec. 8, 2009, with translation, 2 pages.

Extended European Search Report Issued in European Application No. 09809480.8, Dec. 14, 2011 (6 Pages).

English Patent Abstract of JP 10-54741, Publication Date: Feb. 24, 1998 (1 Page).

* cited by examiner

Upper side

Lower side

FLOW RATE MEASUREMENT DEVICE HAVING AN AUXILIARY PASSAGE ARRANGEMENT THAT PREVENTS LIQUID BREAKING INTO THE DETECTION PASSAGE

BACKGROUND OF THE INVENTION

1. Technical Field

The present invention relates to a flow rate measurement device for measuring a flow rate of a gas, for example to a flow rate measurement device used in medical instruments such as treatment equipment for sleep apnea syndrome, industrial instruments for monitoring an air flow rate in factories, use in instrument embedment, and the like.

2. Background Art

In general, in a straight pipe type flow rate measurement device for directly measuring a great flow rate among flow rate measurement devices, there is a need for enlarging a diameter of a pipe in order to lower flow speed by a measurable area of a flow rate detection element. Thus, downsizing of the device is limited. In order to downsize the flow rate measurement device for measuring a great flow rate, in general, a flow rate measurement device having a bypass flow passage structure is proposed. In the flow rate measurement device having the bypass flow passage structure, an auxiliary flow passage diverges from a main flow passage, flow speed of a gas flowing in the auxiliary flow passage is measured by a flow rate detection element, and a total flow rate is determined by a diversion ratio of the main flow passage and the auxiliary flow passage and the flow speed in the auxiliary flow passage.

However, in such a flow rate measurement device having the bypass flow passage structure, flow speed distribution on a vertical section in the main flow passage easily becomes inhomogeneous due to existence of the auxiliary flow passage. When the flow speed distribution in the main flow passage is inhomogeneous, the diversion ratio to the auxiliary flow passage becomes unstable. Thus, a precise total flow rate is not easily determined.

(Patent Document 1)

A flow rate measurement device having a bypass flow passage structure for improving a decrease in measurement precision due to such inhomogeneity of the flow speed distribution is shown in FIG. 1 (refer to Patent Document 1). In this flow rate measurement device 11, an orifice (not shown) is provided in a main flow passage 13, and an auxiliary flow passage 14 is provided on a main flow pipe 12 astride an outer peripheral surface of the main flow pipe 12 having the main flow passage 13.

The auxiliary flow passage 14 has the following structure. On an inner wall of the main flow passage 13, introduction ports 15 are provided on both the left and right sides on the upstream side of the orifice, and discharge ports 16 are provided on both the left and right sides on the downstream side of the orifice. Upper ends of introduction flow passages 17 (introduction vertical grooves) extending upward from the introduction ports 15 and upper ends of discharge flow passages 18 (discharge vertical grooves) extending upward from the discharge ports 16 are connected to each other by first auxiliary flow passages 19 so as to communicate with each other. The upper ends of the left and right introduction flow passages 17 are connected to each other by a second auxiliary flow passage 20 so as to communicate with each other, the upper ends of the left and right discharge flow passages 18 are connected to each other by another second auxiliary flow passage 21 so as to communicate with each other, and center parts of both the second auxiliary flow passages 20, 21 are connected to each other by a horizontal detection flow passage 22 so as to communicate with each other. A flow rate detection element (not shown) for measuring flow speed of a gas is provided in the detection flow passage 22.

When the gas passes through the interior of the main flow passage 13 of this flow rate measurement device 11, part of the gas flows from the introduction ports 15 into the auxiliary flow passage 14, returns from the discharge ports 16 to the main flow passage 13 through a route as shown by arrows in FIG. 1, and then flows in the main flow passage 13 again. At this time, the gas flowing into the introduction flow passages 17 bifurcates and flows into the first auxiliary flow passages 19 and the second auxiliary flow passage 20, so that part of the gas flows into the second auxiliary flow passage 20. The gas flowing into the second auxiliary flow passage 20 from the left and right sides together flows into the detection flow passage 22. The flow speed of the gas passing through the detection flow passage 22 is measured, and a total flow rate is determined by a diversion ratio of the main flow passage 13 and the detection flow passage 22, and the flow speed in the detection flow passage 22.

(Patent Document 2)

Similarly, in a flow rate measurement device disclosed in Patent Document 2, an orifice is arranged in a main flow passage, four introduction flow passages and four discharge flow passages forming an auxiliary flow passage diverge from the main flow passage respectively on the upstream side and the downstream side of the orifice, a gas introduced from the introduction flow passages is collected into one detection flow passage, deviation of flow speed distribution is averaged, and then flow speed of the gas is measured by a flow rate detection element.

Patent Document 1: Japanese Patent No. 3870969 (FIG. 15)

Patent Document 2: U.S. Pat. No. 5,279,155

SUMMARY

A flow rate measurement device is not only used for measuring a flow rate of a dry gas like a gas meter for a city gas but also used in an environment where dew condensation water is easily generated or used together with an instrument storing a liquid.

One example thereof is treatment equipment for sleep apnea syndrome used in examination and treatment of sleep apnea syndrome (Continuous Positive Airway Pressure). This equipment is to feed air by a mechanical power source such as a pump and a fan motor so as to ensure aspiration of a patient. The flow rate measurement device is used for monitoring a gas flow rate changed in accordance with a change in an aspiration state of the patient. In this treatment equipment, a humidifier is connected to a flow passage in which the flow rate measurement device is provided, and is some cases, the gas containing water vapor generated by the humidifier is fed to a mask attached to the patient through a hosepipe.

In such equipment, a great flow rate of the gas has to be measured, and furthermore, downsizing is required, and the flow passages are required to have low pressure loss for using a small-power mechanical power source. Therefore, a flow rate measurement device having a bypass flow passage structure is used as the flow rate measurement device.

However, in such a use, the dew condensation water generated inside the flow rate measurement device may flow into a detection flow passage provided with a flow rate detection element, or water of the humidifier may flow into the detection flow passage.

The flow rate detection element is exposed in the detection flow passage for measuring flow speed of the gas. Thus, when the water flowing into the detection flow passage adheres onto the flow rate detection element, there is a fear that measurement precision of the flow rate detection element is lowered or the element itself is deteriorated. When the water does not adhere onto the flow rate detection element but the water breaking into the detection flow passage remains in the detection flow passage, a section area of the detection flow passage is changed, so that the flow speed of the gas passing through the detection flow passage is increased, and a diversion ratio of a main flow passage and the detection flow passage is also changed. Thus, the measurement precision of the flow rate measurement device is lowered.

In the flow rate measurement device 11 described in Patent Document 1, as shown in FIG. 1, the horizontally arranged second auxiliary flow passage 20 or 21 and the detection flow passage 22 are perpendicularly crossing on a horizontal plane. Thus, once water flows into the second auxiliary flow passage 20 or 21, the water easily further breaks into the detection flow passage 22. At the time of carrying an instrument in which the flow rate measurement device 11 is built or the like, when the instrument is overturned and the flow rate measurement device 11 lies on the side, the second auxiliary flow passage 20 or 21 is placed in the vertical direction as shown in FIG. 2. Thus, as shown by an arrow in FIG. 2, the water passes through the second auxiliary flow passage 20 or 21 from the upper side to the lower side, and at that time, there is a high possibility that the water breaks into the detection flow passage 22.

In the flow rate measurement device described in Patent Document 2 as well, the detection flow passage is formed perpendicularly to the introduction flow passages or the discharge flow passages. Thus, once the water flows into the introduction flow passages or the discharge flow passages, the water easily further breaks into the detection flow passage. As well as the case of the flow rate measurement device 11 (refer to FIG. 2), when the water passes through the vertically placed introduction flow passages or the vertically placed discharge flow passages from the upper side to the lower side, there is a high possibility that the water breaks into the detection flow passage. Further, in the flow rate measurement device of Patent Document 2, since the introduction flow passages and the discharge flow passages are arranged in all directions of center of the main flow passage, a water discharge property due to gravity is unfavorable. Thus, once the water breaks into the introduction flow passages, the discharge flow passages, or the detection flow passage, the water is not easily discharged.

As described above, the flow rate measurement device having the bypass flow passage structure is used in a state that the gas is in contact with the liquid or water vapor or used in a state that the main flow passage communicates with a point where the liquid is accumulated. When the liquid flows into the detection flow passage of the flow rate measurement device due to an unanticipated affair, characteristics of the flow rate measurement device are influenced. Therefore, a flow rate measurement device having a structure that the gas can pass through the detection flow passage but the liquid does not easily break into the detection flow passage is desired.

One or more embodiments of the present invention provides a structure that a liquid does not easily adhere onto a flow rate detection element, and the liquid does not easily break into or remain in a detection flow passage in which the flow rate detection element is provided in a flow rate measurement device having a bypass flow passage structure for measuring a great flow rate.

According to one or more embodiments of the present invention, a flow rate measurement device includes a main flow pipe having a main flow passage through which a gas passes, an orifice for limiting a flow of the gas in the main flow passage, and an auxiliary flow passage block provided with an auxiliary flow passage having one end communicating with a pair of introduction ports opened in the main flow passage on the upstream side of the orifice and the other end communicating with a pair of discharge ports opened in the main flow passage on the downstream side of the orifice, wherein the auxiliary flow passage includes a pair of introduction flow passages having upstream ends respectively communicating with the introduction ports, an upstream auxiliary flow passage having both ends respectively connected to downstream ends of the introduction flow passages, a pair of discharge flow passages having downstream ends respectively communicating with the discharge ports, a downstream auxiliary flow passage having both ends respectively connected to upstream ends of the discharge flow passages, and a detection flow passage having an upstream end connected to the upstream auxiliary flow passage and a downstream end connected to the downstream auxiliary flow passage, the detection flow passage including a flow rate detection element, the upstream end of the detection flow passage is positioned on the upstream side of the main flow passage relative to the both ends of the upstream auxiliary flow passage, and the downstream end of the detection flow passage is positioned on the downstream side of the main flow passage relative to the both ends of the downstream auxiliary flow passage.

With the flow rate measurement device according to one or more embodiments of the present invention, the upstream end of the detection flow passage is positioned on the upstream side of the main flow passage relative to the both ends of the upstream auxiliary flow passage, and the downstream end of the detection flow passage is positioned on the downstream side of the main flow passage relative to the both ends of the downstream auxiliary flow passage. Thus, even when an instrument in which the flow rate measurement device is built falls down and the flow rate measurement device is vertically placed or lies on the side, a liquid does not easily breaks into the detection flow passage, so that the detection flow passage is not easily contaminated by the liquid and the liquid does not easily adhere onto the flow rate detection element. Therefore, even in a case where the flow rate measurement device is built in an instrument using the liquid, characteristics of the flow rate measurement device are not easily lowered even with the liquid breaking into the flow rate measurement device.

In a flow rate measurement device according to one or more embodiments of the present invention, the upstream end of the detection flow passage is connected to the upstream auxiliary flow passage at a position away from the downstream ends of the introduction flow passages, and the downstream end of the detection flow passage is connected to downstream auxiliary flow passage at a position away from the upstream ends of the discharge flow passages. With such an arrangement, the upstream auxiliary flow passage or the downstream auxiliary flow passage is placed between the introduction flow passages or the discharge flow passages and the detection flow passage. Thus, the liquid breaking into the introduction flow passages or the discharge flow passages can be prevented from directly flowing into the detection flow passage.

In a flow rate measurement device according to one or more embodiments of the present invention, a bottom surface of the upstream auxiliary flow passage is inclined so as to be lowered gradually from a point where the upstream auxiliary flow passage is connected to the detection flow passage toward the both ends respectively connected to the introduction flow passages. With such an arrangement, the liquid breaking into the upstream auxiliary flow passage is discharged to the side of the introduction flow passages by inclination of the bottom surface of the upstream auxiliary flow passage. Thus, the liquid does not easily break into the detection flow passage.

In a flow rate measurement device according to one or more embodiments of the present invention, a bottom surface of the downstream auxiliary flow passage is inclined so as to be lowered gradually from a point where the downstream auxiliary flow passage is connected to the detection flow passage toward the both ends respectively connected to the discharge flow passages. With such an arrangement, the liquid breaking into the downstream auxiliary flow passage is discharged to the side of the discharge flow passages by inclination of the bottom surface of the downstream auxiliary flow passage. Thus, the liquid does not easily break into the detection flow passage.

In a flow rate measurement device according to one or more embodiments of the present invention, side auxiliary flow passages respectively connecting the downstream ends of the introduction flow passages and the upstream ends of the discharge flow passages are provided, and ends of bottom surfaces of the side auxiliary flow passages are respectively lower than an end of a bottom surface of the upstream auxiliary flow passage or an end of a bottom surface of the upper auxiliary flow passage. With such an arrangement, the liquid breaking from the introduction flow passages and the discharge flow passages flows to the side auxiliary flow passages which are lower than the upstream flow passage and the downstream flow passage. Thus, the liquid does not easily flow to the detection flow passage through the upstream flow passage and the downstream flow passage.

In a flow rate measurement device according to one or more embodiments of the present invention, the auxiliary flow passage has a symmetric structure relative to a plane passing through center of the flow rate detection element, the plane being perpendicular to the axial direction of the main flow passage. With such an arrangement, a flow of the gas in the auxiliary flow passage can be stabilized.

DETAILED DESCRIPTION

Hereinafter, embodiments of the present invention will be described with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(First Embodiment)

Figure 3:
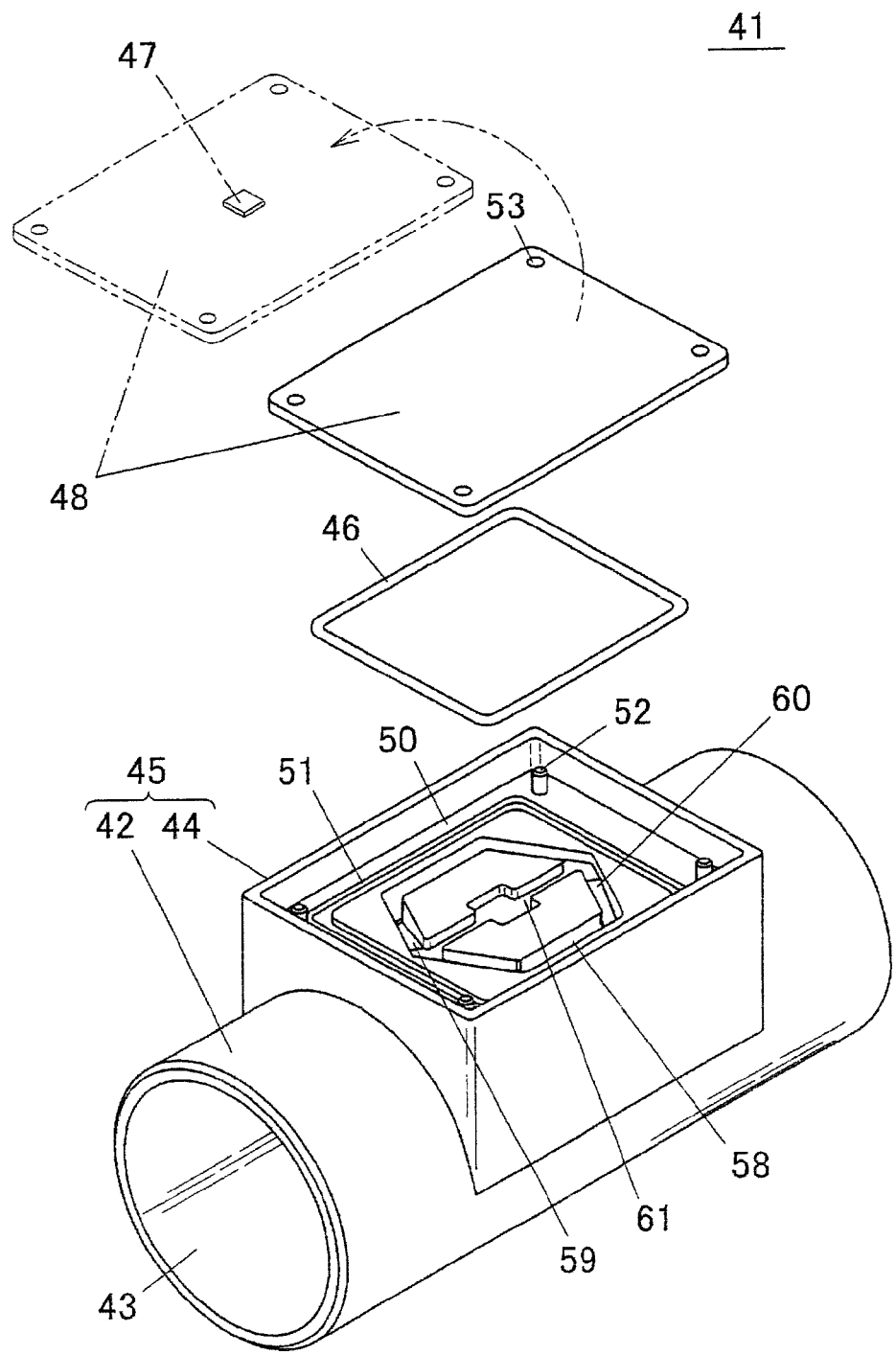
FIG. 3 is an exploded perspective view of a flow rate measurement device according to a first embodiment of the present invention.
Figure 4:
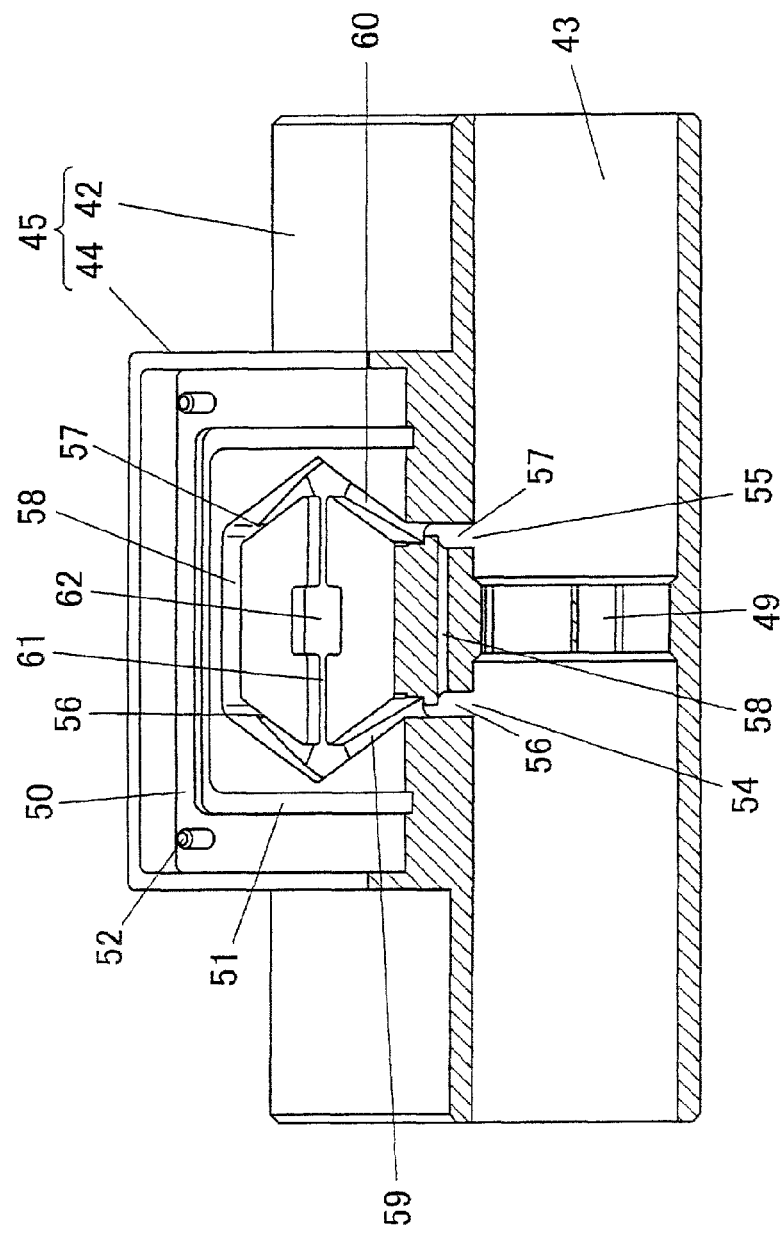
FIG. 4 is a partially-broken perspective view showing a base member used in the flow rate measurement device of the first embodiment.
Figure 5:
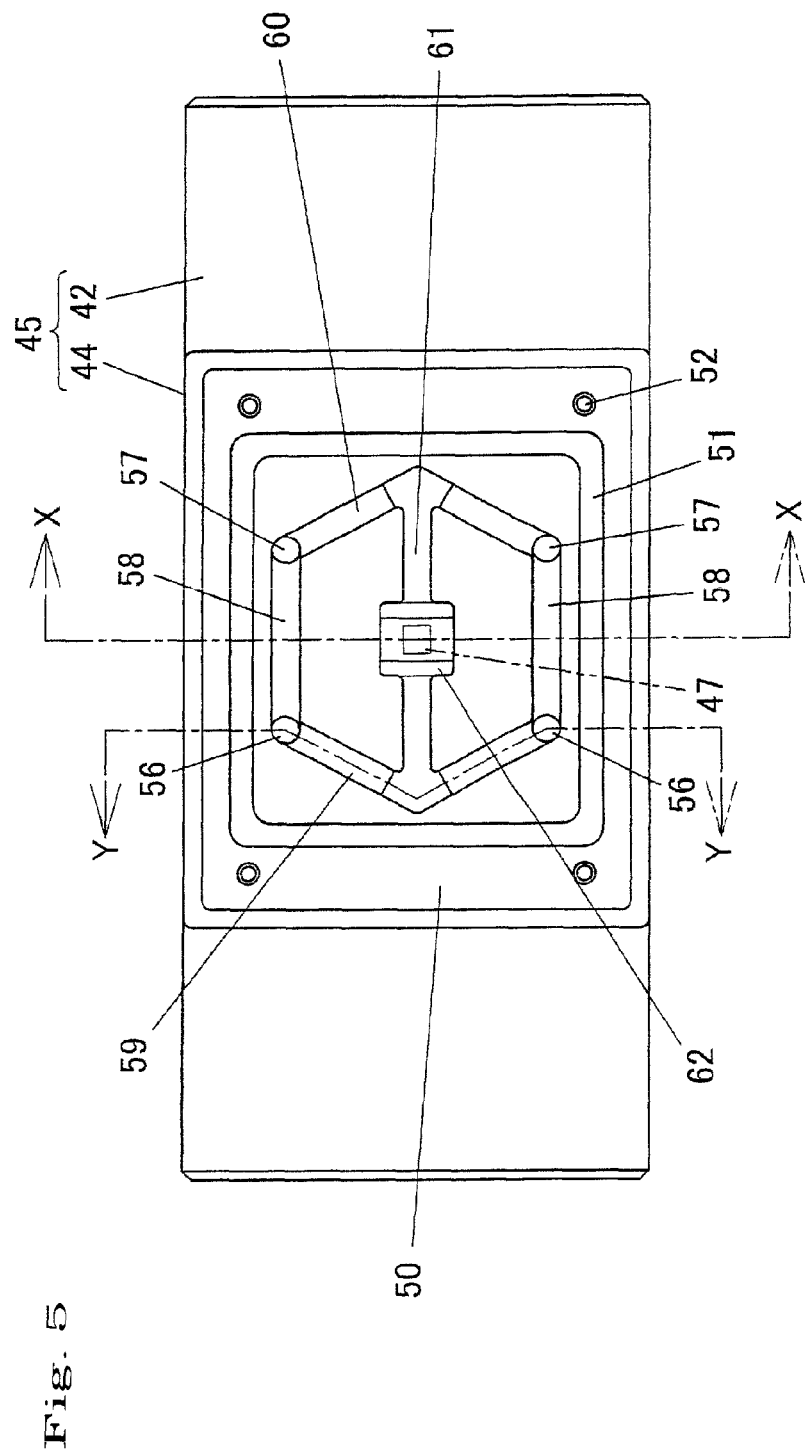
FIG. 5 is a plan view of the same base member.
Figure 6:
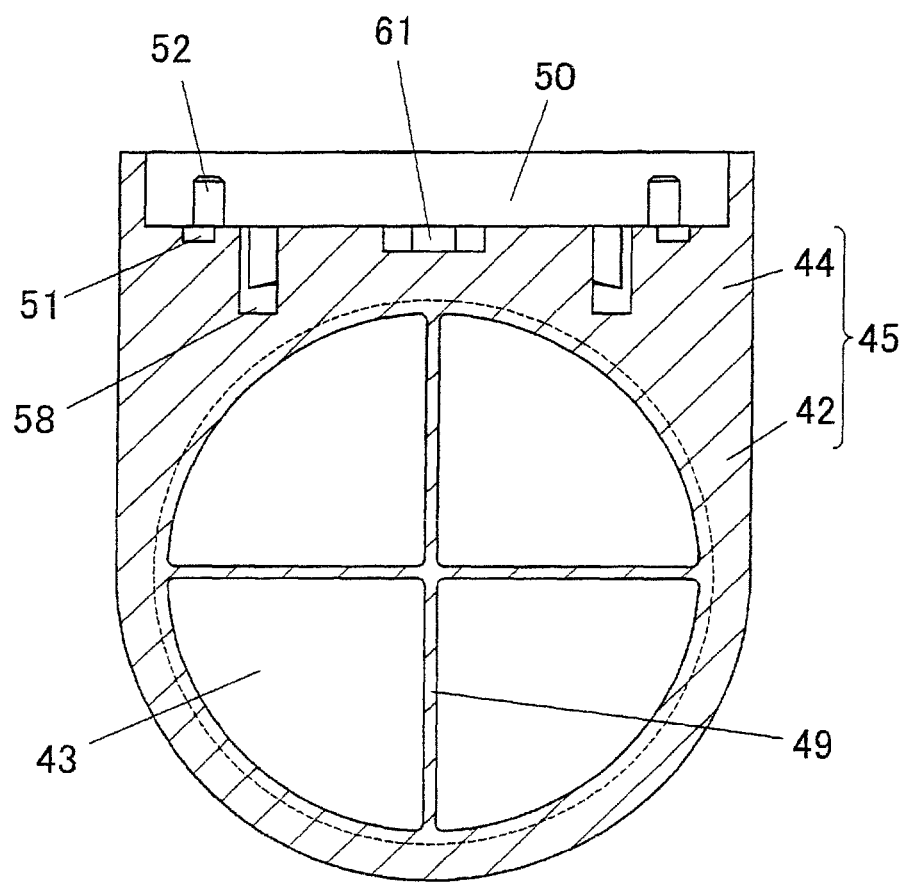
FIG. 6 is a sectional view by the line X-X of FIG. 5.
Figure 7:
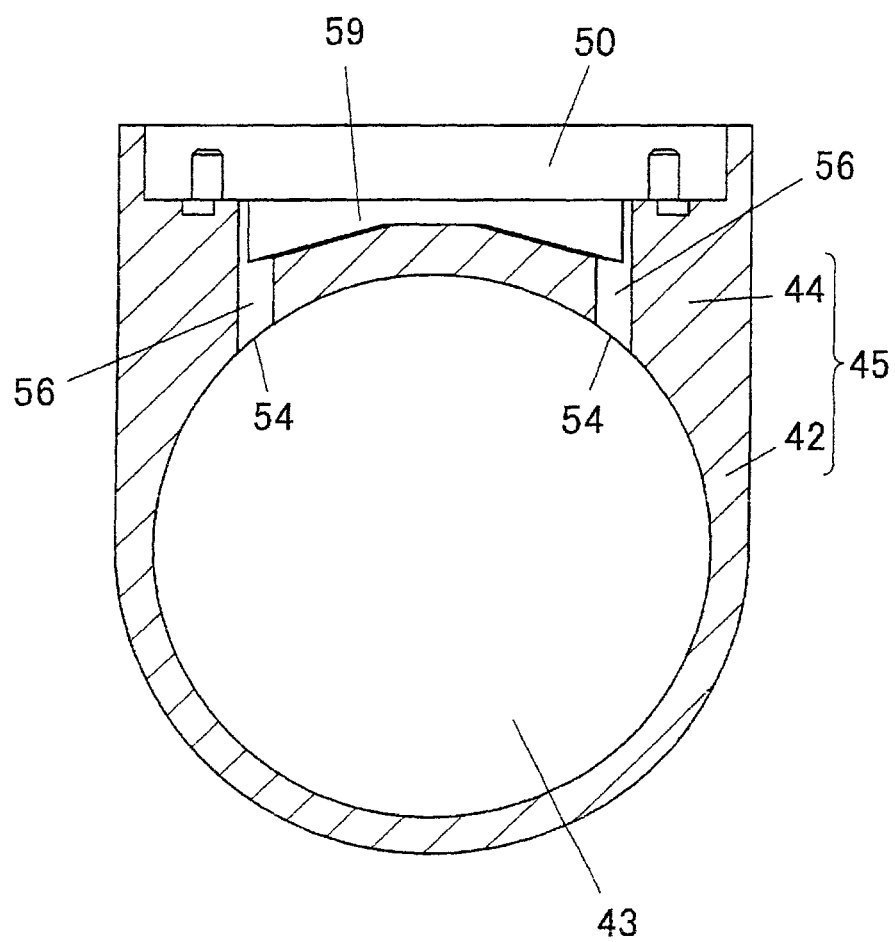
FIG. 7 is a sectional view by the line Y-Y of FIG. 5.

Hereinafter, a structure of a flow rate measurement device according to a first embodiment of the present invention will be described with reference to FIGS. 3 to 7. FIG. 3 is an exploded perspective view of a flow rate measurement device 41 according to the first embodiment. FIG. 4 is a partially-broken perspective view of a base member of the flow rate measurement device 41. FIG. 5 is a plan view of the base member, FIG. 6 is a sectional view by the line X-X of FIG. 5, and FIG. 7 is a sectional view by the line Y-Y of FIG. 5.

As shown in FIG. 3, the flow rate measurement device 41 of the first embodiment includes a synthetic resin base member 45 formed by integrating an auxiliary flow passage block 44 for forming an auxiliary flow passage on an outer peripheral surface of a main flow pipe 42, an annular seal member 46 made of an insulating material such as rubber, and a circuit substrate 48 in which a flow rate detection element 47 is mounted on a lower surface.

A recess portion 50 is formed on the substantially entire upper surface of the auxiliary flow passage block 44 having a box shape outer appearance. A seal groove 51 into which the seal member 46 is to be fitted is annularly provided on a bottom surface of the recess portion 50 so as to surround an auxiliary flow passage formation area (an area in which first auxiliary flow passages 58, second auxiliary flow passages 59, 60, and a detection flow passage 61 described later are formed) provided in the recess portion 50. Projections 52 for thermal caulking of the circuit substrate 48 protrude at four corners on the outer side of the seal groove.

After the seal member 46 is fitted into the seal groove 51, the circuit substrate 48 is brought into the recess portion 50 in a state that the flow rate detection element 47 is placed on the lower side, the projections 52 are inserted into holes 53 of the circuit substrate 48, and the projections 52 are thermally caulked onto the circuit substrate 48, so that the flow rate measurement device 41 is assembled.

It should be noted that the circuit substrate 48 may be fixed to the base member 45 with using a method other than thermal caulking such as screws. An upper surface of the auxiliary flow passage block 44 is covered with a cover (not shown).

In a state that the flow rate measurement device 41 is assembled in such a way, an upper surface of the auxiliary flow passage formation area is covered with the circuit substrate 48, and the flow rate detection element 47 is placed at a predetermined position in the auxiliary flow passage formation area. The seal member 46 is pressed between the seal groove 51 and the circuit substrate 48, and the circuit substrate 48 does not have holes other than the holes 53 for the thermal caulking. Thus, the seal member 46 and the like prevent a gas from leaking from the flow passage formation area to the exterior.

Figure 8:
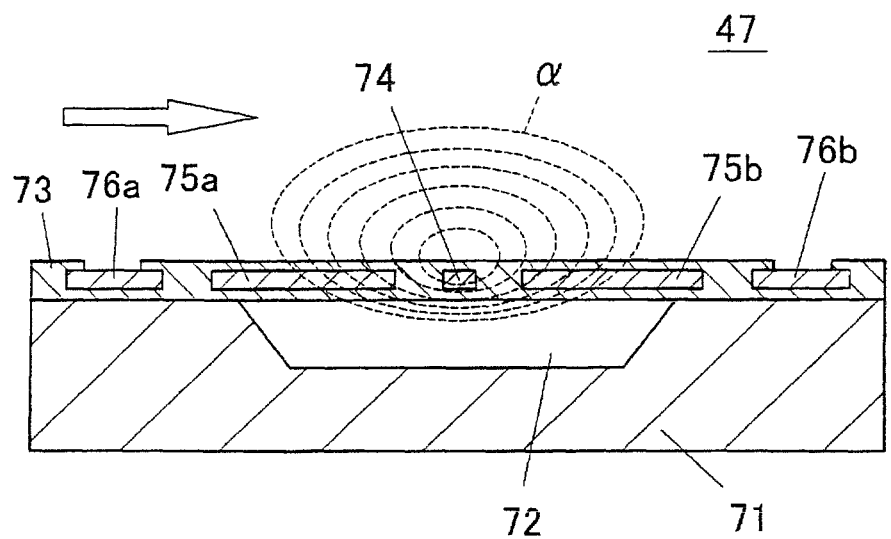
FIG. 8 is a schematic sectional view showing one example of a flow rate detection element (a flow sensor).

The flow rate detection element 47 can be any type as long as the flow rate detection element can measure flow speed of the gas. As the flow rate detection element 47, for example, a flow sensor having a heater and thermopiles can be used. In this flow rate detection element 47, as shown in FIG. 8, a cavity 72 is formed on an upper surface of a substrate 71 by etching, an insulating thin film 73 is extended on the cavity 72, and an edge of the insulating thin film 73 is held by the substrate 71. A heater 74 is formed by polysilicon in a center part of the insulating thin film 73, and thermopiles 75a, 75b are respectively provided on the upstream side and the downstream side of the heater 74. The thermopiles 75a, 75b are formed by alternately connecting Al linear elements and polysilicon linear elements, and arranging the linear elements in a zigzag way. The thermopiles 75a, 75b are arranged symmetrically relative to the heater 74, so as to measure temperatures of symmetrical positions on the both sides of the heater 74.

It should be noted that the reference numerals 76a, 76b denote electrode pads of the heater 74 and the thermopiles 75a, 75b.

At the time of measurement, the heater 74 generates heat at a predetermined temperature, and predetermined temperature distribution a (a temperature gradient) is generated around the heater 74. The thermopiles 75a, 75b are symmetrically arranged. Thus, in a case where the gas does not flow over the heater 74, detected temperatures of both the thermopiles 75a, 75b are the same, and a temperature difference is zero.

Meanwhile, when a flow of the gas is generated over the heater 74, the heat of the heater 74 is transported to the downstream side, and the temperature distribution a is shifted to the downstream side. Thus, the detected temperature of the thermopile 75b on the downstream side is increased, and the detected temperature of the thermopile 75a on the upstream side is lowered. Therefore, the flow speed of the gas can be calculated from the temperature difference between the detected temperatures of both the thermopiles 75a, 75b.

With such a flow rate detection element 47, when the flow rate detection element 47 is wetted with a liquid, abnormality is generated in the temperature distribution a around the heater 74, or the electrode pads 76a, 76b make a short circuit. Thus, there is a need for preventing the liquid from breaking into the detection flow passage 61.

The main flow pipe 42 has a main flow passage 43 through which a great flow rate of the gas passes. An orifice 49 (a flow limiter) is provided in a center part of the main flow passage 43 so as to partition the main flow passage 43. The orifice 49 is integrally formed on an inner peripheral surface of the main flow pipe 42, and as shown in FIG. 6, formed by a circular portion having an inner circumferential diameter smaller than a diameter of the main flow passage 43, and a crisscross bar portion provided on the inner side of the circular portion. As shown in FIG. 4, the circular portion of the orifice 49 protrudes on an inner peripheral surface of the main flow passage 43, so that the orifice 49 limits the flow of the gas passing through the main flow passage 43 and the bar portion gives resistance to the gas passing through the main flow passage 43.

As shown in FIGS. 7 and 4, on the upstream side of the orifice 49, two introduction ports 54 are opened in an upper part of an inner surface of the main flow passage 43, and introduction flow passages 56 vertically pass through from the introduction ports 54 toward the interior of the recess portion 50. Similarly, on the downstream side of the orifice 49, two discharge ports 55 are opened in the upper part of the inner surface of the main flow passage 43, and discharge flow passages 57 vertically pass through from the discharge ports 55 toward the interior of the recess portion 50.

As shown in FIG. 4, a horizontal first auxiliary flow passage 58 (a side auxiliary flow passage) extending in parallel to the axial direction of the main flow passage 43 is formed between an upper end of one of the introduction flow passages 56 and an upper end of one of the discharge flow passages 57. The introduction flow passage 56 and the discharge flow passage 57 communicate with each other through the first auxiliary flow passage 58. Similarly, the other introduction flow passage 56 and the other discharge flow passage 57 communicate with each other through a horizontal first auxiliary flow passage 58.

As shown in FIGS. 4 and 5, a second auxiliary flow passage 59 (an upstream auxiliary flow passage) extending in the width direction of the auxiliary flow passage block 44 is formed between the upper ends of the introduction flow passages 56 positioned on both the left and right sides. Thus, an end of a bottom surface of the second auxiliary flow passage 59 is placed at a higher position than bottom surfaces of the first auxiliary flow passages 58. The second auxiliary flow passage 59 has a V shape which is bent at center when seen from the vertically upper side, and the bottom surface of the second auxiliary flow passage 59 is inclined so as to be higher from both ends toward the center (refer to FIG. 7).

Similarly, a second auxiliary flow passage 60 (a downstream auxiliary flow passage) extending in the width direction of the auxiliary flow passage block 44 is formed between the upper ends of the discharge flow passages 57 positioned on the both sides. Thus, an end of a bottom surface of the second auxiliary flow passage 60 is placed at a higher position than the bottom surfaces of the first auxiliary flow passages 58. The second auxiliary flow passage 60 has a V shape which is bent at center when seen from the vertically upper side, and the bottom surface of the second auxiliary flow passage 60 is inclined so as to be higher from both ends toward the center.

A straight detection flow passage 61 is formed between the center of the second auxiliary flow passage 59 positioned on the upstream side and the center of the second auxiliary flow passage 60 positioned on the downstream side. The second auxiliary flow passages 59, 60 communicate with each other through the detection flow passage 61. A measurement chamber 62 having large width is formed in a center part in the longitudinal direction of the detection flow passage 61. The flow rate detection element 47 mounted on the lower surface of the circuit substrate 48 is positioned on a ceiling surface of the measurement chamber 62. A bottom surface passing through the detection flow passage 61 from the center of the second auxiliary flow passage 59 to the center of the second auxiliary flow passage 60 is a horizontal surface. However, in the measurement chamber 62, the bottom surface of the detection flow passage 61 is raised into a trapezoid shape in order to increase the flow speed of the gas.

The second auxiliary flow passages 59, 60 are bent into a V shape, so that the centers of the second auxiliary flow passages 59, 60 are respectively away from the measurement chamber 62. Therefore, length of the detection flow passage 61 is longer than the first auxiliary flow passages 58.

It should be noted that the second auxiliary flow passages 59, 60 and the detection flow passage 61 are formed into a groove shape with open upper surfaces, and openings of the upper surfaces are covered with the circuit substrate 48, so that the flow passages are closed.

The measurement chamber 62 and the flow rate detection element 47 are positioned on the vertically upper side of center of the orifice 49. The auxiliary flow passage including the introduction ports 54, the introduction flow passages 56, the first auxiliary flow passages 58, the second auxiliary flow passage 59, the detection flow passage 61, the measurement chamber 62, the second auxiliary flow passage 60, the discharge flow passage 57, and the discharge ports 55 has a left-right symmetrical structure relative to a vertical plane including the axis of the main flow passage 43, and also a symmetrical structure relative to a plane passing through center of the flow rate detection element 47 (or the center of the orifice 49), the plane being perpendicular to the axis of the main flow passage 43. Thus, the gas smoothly flows in the auxiliary flow passage.

The base member 45 formed by integrating the main flow pipe 42, the orifice 49, and the auxiliary flow passage block 44 has the above structure. Particularly, the introduction flow passages 56 and the discharge flow passages 57 are formed by vertical through holes, and the first auxiliary flow passages 58, the second auxiliary flow passages 59, 60, the detection flow passage 61, and the measurement chamber 62 are all formed by recessed grooves. Thus, the base member can be integrally molded by one injection molding. Specifically, a mold is formed by an upper mold for molding an upper outer peripheral surface of the main flow pipe 42 and the auxiliary flow passage block 44, a lower mold for molding a lower outer peripheral surface of the main flow pipe 42, a first supplementary mold for molding half of the main flow passage 43 and the orifice 49, and a second supplementary mold for molding the remaining half of the main flow passage 43 and the orifice 49. The upper mold and the lower mold are opened in the up and down direction, and the first and second supplementary molds are drawn in the horizontal direction. Thus, in comparison to an auxiliary flow passage block formed by combining a plurality of parts, parts cost and manufacturing cost can be reduced, and variation at the time of assembling the parts can be eliminated.

(Flow of Gas in Auxiliary Flow Passage)

Figure 9:
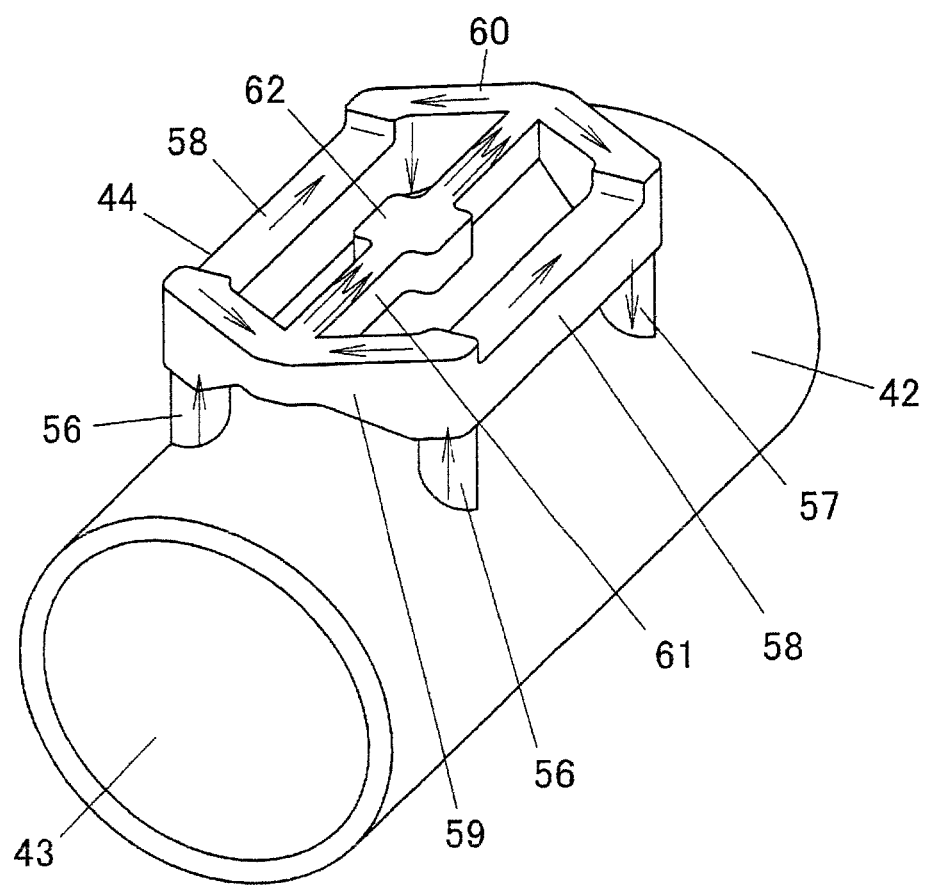
FIG. 9 is a perspective view schematically showing a main flow passage and an auxiliary flow passage.

FIG. 9 is a view schematically showing the auxiliary flow passage including the introduction flow passages 56, the first auxiliary flow passages 58, the second auxiliary flow passage 59, the detection flow passage 61, the second auxiliary flow passage 60, and the discharge flow passages 57 (the flow rate measurement device 41 can be manufactured into a shape as in FIG. 9 in fact). With using the schematic view, the flow of the gas in the flow rate measurement device 41 will be described.

Since the orifice 49 is provided in the main flow passage 43, the gas flowing in the main flow passage 43 receives the resistance by the orifice 49. Therefore, on the upstream side of the orifice 49, pressure of the gas is higher than the downstream side, so that part of the gas easily flows from the introduction ports 54 into the introduction flow passages 56.

When part of the gas passing through in the main flow passage 43 flows from the introduction ports 54 into the introduction flow passages 56, the gas is divided into the first auxiliary flow passages 58 and the second auxiliary flow passage 59 at the upper ends of the introduction flow passages 56. The gas entering the first auxiliary flow passages 58 passes through the first auxiliary flow passages 58 to the discharge flow passages 57, returns from the discharge ports 55 to the main flow passage 43 again, and then flows in the main flow passage 43.

Since the introduction ports 54 are provided on both the left and right sides, the gas flows into the second auxiliary flow passage 59 from both ends, and the gas joining in a center part of the second auxiliary flow passage 59 passes through in the detection flow passage 61. The measurement chamber 62 provided in the center part of the detection flow passage 61 has larger width than the detection flow passage 61 and lower height than the detection flow passage 61. Thus, the gas passing through the measurement chamber 62 passes through a surface of the flow rate detection element 47 while being thinly spread, so that the flow speed is detected. A flow rate of the gas passing through the main flow passage 43 is calculated from a diversion ratio of the main flow passage 43 and the detection flow passage 61, the flow speed detected by the flow rate detection element 47, and the like.

The gas coming from the end of the detection flow passage 61 to the center of the second auxiliary flow passage 60 is divided into the left and right sides so as to pass through in the second auxiliary flow passage 60, returns to the main flow passage 43 again through the discharge flow passages 57, and then flows in the main flow passage 43.

Therefore, in this flow rate measurement device 41, the diversion ratio of the main flow passage 43 and the detection flow passage 61 is set to be an appropriate value. Thus, even when the diameter of the main flow passage 43 is small and the flow speed is high, the flow speed can be lowered down to a flow speed range suitable for measurement by the flow rate detection element 47 (a range in which an output is linear) in the measurement chamber 62. Therefore, the flow rate measurement device 41 capable of measuring a great flow rate can be downsized. Since the orifice 49 is provided in the main flow passage 43, the flow speed distribution of the gas on a section perpendicular to the axial direction of the main flow passage 43 can be homogenized. Thus, variation of the diversion ratio of the main flow passage 43 and the detection flow passage 61 is reduced, so that measurement precision can be improved.

The first auxiliary flow passages 58 have a function of reducing the flow rate of the gas flowing in the detection flow passage 61 by bypassing the gas, and a function of optimizing the flow speed in the measurement chamber 62 by adjusting a section area of the first auxiliary flow passages 58. Furthermore, since the first auxiliary flow passages 58 are formed by providing recessed grooves on the upper surface of the auxiliary flow passage block 44, adjustment of the section area is easily performed due to a mold structure.

(Elimination of Liquid)

Meanwhile, this flow rate measurement device 41 has a structure by which the liquid does not easily break into the detection flow passage 61 for the above reasons, so that the detection flow passage 61 and the flow rate detection element 47 are not easily contaminated by the liquid.

For example, assuming that the liquid breaks into the introduction flow passages 56 from the introduction ports 54, and the liquid adheres onto wall surfaces of the introduction flow passages 56. At this time, there is a possibility that the liquid is blown up by the flow of the gas and brought into deep parts of the introduction flow passages 56. However, even when the liquid reaches to the upper ends of the introduction flow passages 56, as shown in FIG. 4 or 9, the end of the bottom surface of the second auxiliary flow passage 59 is higher than the bottom surfaces of the first auxiliary flow passages 58. Thus, the liquid reaching to the upper ends of the introduction flow passages 56 does not easily break into the side of the second auxiliary flow passage 59 but can easily break into the side of the first auxiliary flow passages 58. The liquid breaking into the first auxiliary flow passages 58 is discharged into the main flow passage 43 through the first auxiliary flow passages 58 and the discharge ports 55. Therefore, in this flow rate measurement device 41, since the bottom surfaces of the first auxiliary flow passages 58 are provided at lower positions than the bottom surfaces of the second auxiliary flow passages 59, 60, the liquid breaking into the introduction flow passages 56 does not easily reach to the detection flow passage 61.

When the flow rate measurement device 41 is in a normal posture, and even if the liquid enters the second auxiliary flow passage 59 or 60, due to the fact that both the bottom surfaces of the second auxiliary flow passages 59 and 60 are inclined downward from the centers toward the both ends as shown in FIG. 7, the liquid breaking into the second auxiliary flow passage 59 or 60 is discharged from the second auxiliary flow passage 59 or 60 to the introduction ports 54 or the discharge ports 55 by inclination of the bottom surface of the second auxiliary flow passage 59 or 60. In this flow rate measurement device 41, the bottom surfaces of the second auxiliary flow passages 59, 60 are inclined obliquely downward from the centers to the both ends. Thus, even when the liquid breaks into the second auxiliary flow passages 59, 60, the liquid does not easily flow into the detection flow passage 61.

Figure 1:
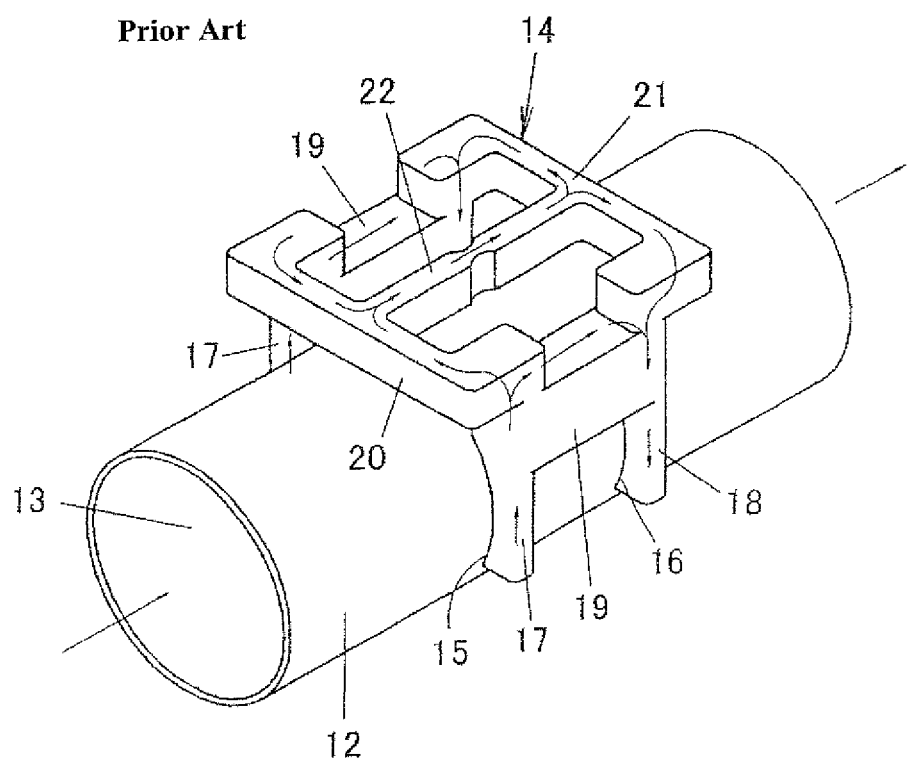
FIG. 1 is a perspective view of a flow rate measurement device described in Patent Document 1.
Figure 2:
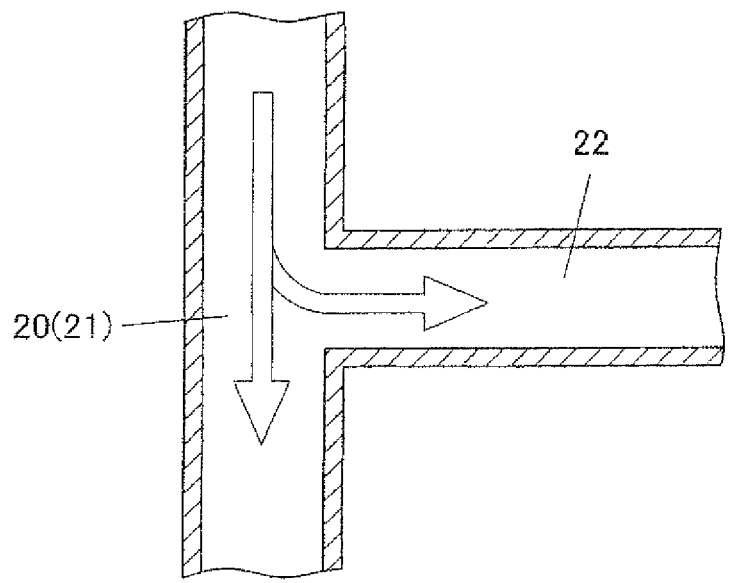
FIG. 2 is a view for illustrating a state that water flowing down in a second auxiliary flow passage breaks into a detection flow passage when an instrument in which the flow rate measurement device is built is overturned.

In a flow rate measurement device 11 of a conventional example, second auxiliary flow passages 20, 21 are straight. Thus, in a case where an instrument in which the flow rate measurement device 11 is built is overturned, and when the liquid flows down in the vertically placed second auxiliary flow passages 20, 21, there is a fear that the liquid goes around and breaks into a detection flow passage 22 (refer to FIG. 2).

Figure 10:
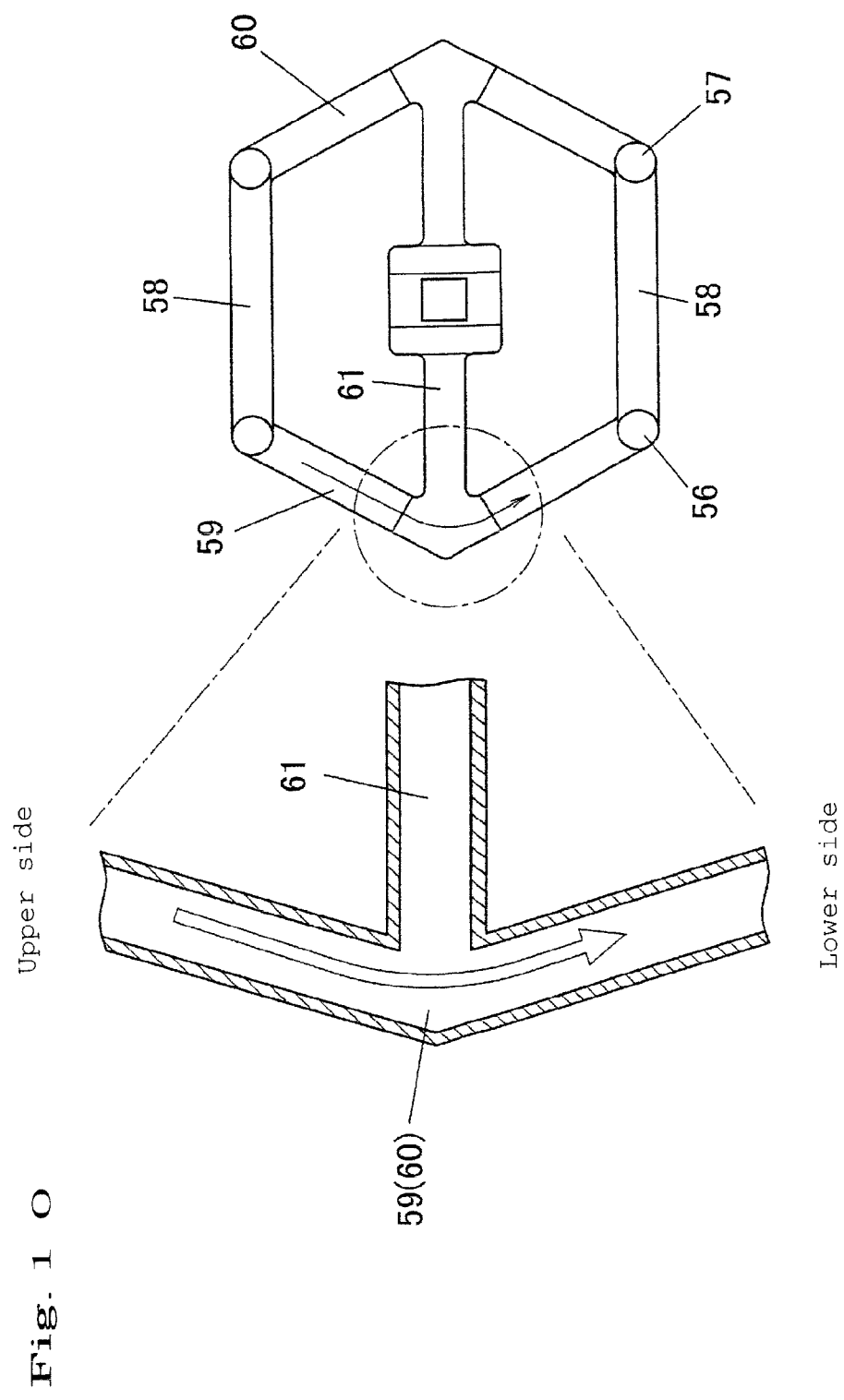
FIG. 10 is an enlarged sectional view showing the auxiliary flow passage falling down so that second auxiliary flow passages are vertically placed and part thereof.

Meanwhile, in the flow rate measurement device 41 of the above embodiment, the center parts of the second auxiliary flow passages 59, 60 connected to the detection flow passage 61 are bent so as to project toward the opposite sides of the detection flow passage 61. Therefore, at the time of carrying the instrument or the like, in a case where the instrument is overturned, the auxiliary flow passage lies on the side in a posture shown in FIG. 10. When the liquid flows down by self-weight in the vertically placed second auxiliary flow passages 59, 60 in this state, as shown by an arrow in FIG. 10, the liquid obliquely flows down in the second auxiliary flow passages 59, 60 toward the end of the detection flow passage 61 on the upper side of the detection flow passage 61, flows in the direction of going away from the end of the detection flow passage 61 immediately before the end of the detection flow passage 61, and moves in the second auxiliary flow passages 59, 60 from the upper side to the lower side of the detection flow passage 61 while avoiding the end of the detection flow passage 61. Thus, the liquid does not easily break into the detection flow passage 61. Furthermore, since the bottom surfaces of the second auxiliary flow passages 59, 60 are inclined, a flow passage section area is large in the both ends and the smallest in the centers in the second auxiliary flow passages 59, 60. Thus, the liquid flowing toward the centers of the second auxiliary flow passages 59, 60 is accelerated gradually toward the centers, so that the liquid further does not easily enter the detection flow passage 61. The liquid flowing down in the second auxiliary flow passages 59, 60 is discharged from the introduction ports 54 or the discharge ports 55. In this flow rate measurement device 41, the second auxiliary flow passages 59, 60 are bent into a V shape. Thus, even in a case where the flow rate measurement device 41 is overturned, the liquid does not easily flow into the detection flow passage 61.

Figure 11:
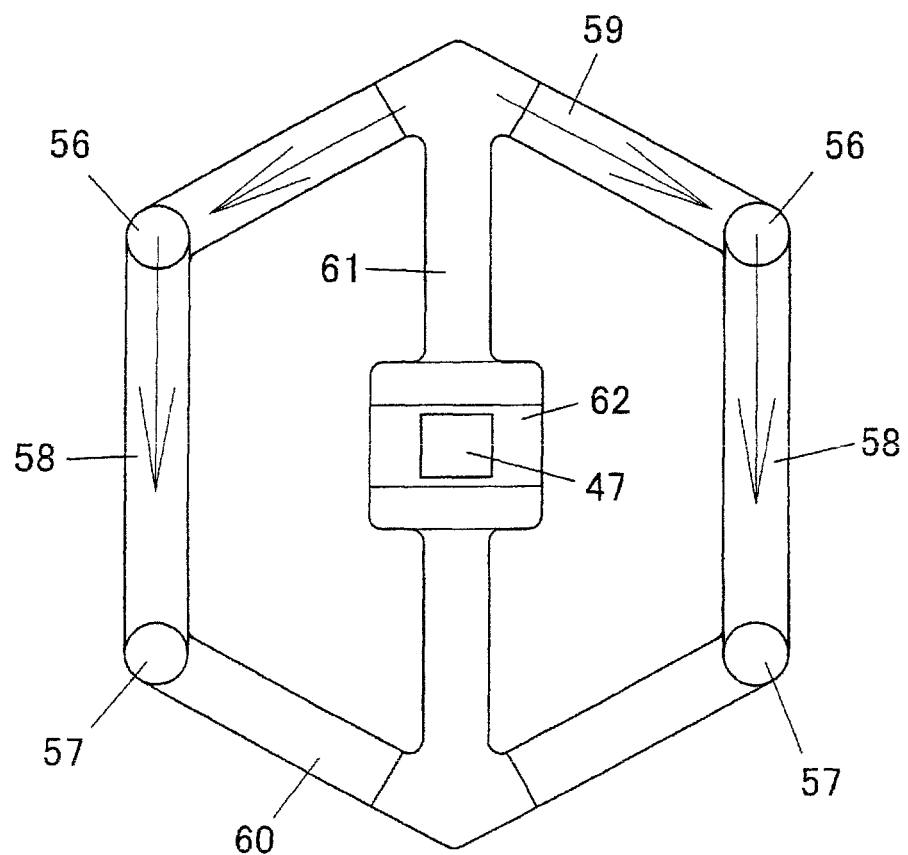
FIG. 11 is a view showing the auxiliary flow passage falling down so that an auxiliary flow passage 61 is vertically placed.

In a case where the instrument in which the flow rate measurement device 41 is built falls down and the detection flow passage 61 is vertically placed as shown in FIG. 11, the upper second auxiliary flow passage (here, the second auxiliary flow passage 59) has a reversed V shape when seen from the front side. Thus, the liquid entering here is discharged to the both sides along the second auxiliary flow passage 59 as shown by arrows in FIG. 11, and further flows down to the lower side from the first auxiliary flow passages 58. Therefore, even when the liquid enters the second auxiliary flow passage 59, there is little fear that the liquid breaks into the detection flow passage 61.

At this time, the liquid flowing down in the first auxiliary flow passages 58 is accumulated in the center of the lower second auxiliary flow passage (the second auxiliary flow passage 60). When the instrument is arranged in a normal posture, the liquid accumulated in the center of the second auxiliary flow passage 60 flows to the both ends by the inclination of the bottom surface of the second auxiliary flow passage 60, and is discharged from the discharge flow passages 57 to the main flow passage 43. In this flow rate measurement device 41, the second auxiliary flow passages 59, 60 are bent into a V shape and the bottom surfaces of the second auxiliary flow passages 59, 60 are inclined. Thus, even in a case where the flow rate measurement device 41 is overturned, the liquid does not easily flow into the detection flow passage 61.

Therefore, in this flow rate measurement device 41, the detection flow passage 61 and the flow rate detection element 47 are not easily contaminated by contact with the liquid. Particularly, even in a case where the flow rate measurement device is used in an instrument provided with a tank accumulating the liquid or the like, and even when the liquid remaining in the tank flows out at the time of carrying the instrument, the liquid does not easily flow into the detection flow passage 61. Furthermore, when the instrument is installed in a correct posture, the liquid flowing into the auxiliary flow passage can be promptly discharged to the main flow passage 43. Therefore, in this flow rate measurement device 41, deterioration of characteristics of the flow rate measurement device 41 can be suppressed even in an environment where the liquid is used.

It should be noted that in order to increase a discharge property of the breaking liquid, surface treatment is desirably performed so that maximum height of surface roughness is not more than 25 μm on surfaces of the auxiliary flow passage (particularly surfaces of the first auxiliary flow passages 58, the second auxiliary flow passages 59, 60, the detection flow passage 61, and the measurement chamber 62).

(Second Embodiment)

Figure 12:
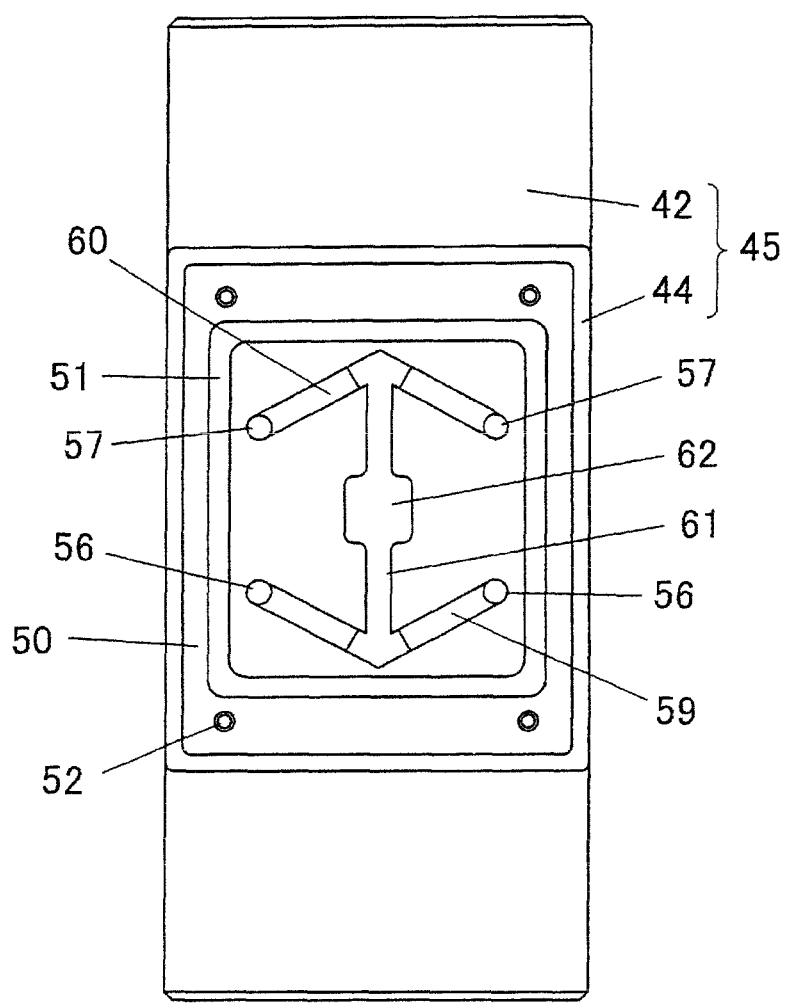
FIG. 12 is a plan view of a base member used in the flow rate measurement device according to a second embodiment of the present invention.

FIG. 12 is a plan view of a base member 81 used in the flow rate measurement device according to a second embodiment of the present invention. In this embodiment, the left and right first auxiliary flow passages 58 in the first embodiment are omitted, and the introduction ports 54 and the discharge ports 55 are not directly connected to each other. With such a structure, since the gas does not flow to the first auxiliary flow passages, the flow rate in the detection flow passage 61 can be increased. In this embodiment, the bottom surface of the measurement chamber 62 is not raised, and the bottom surface of the detection flow passage 61 is formed to be flat from one end to the other end.

(Third Embodiment)

Figure 13:
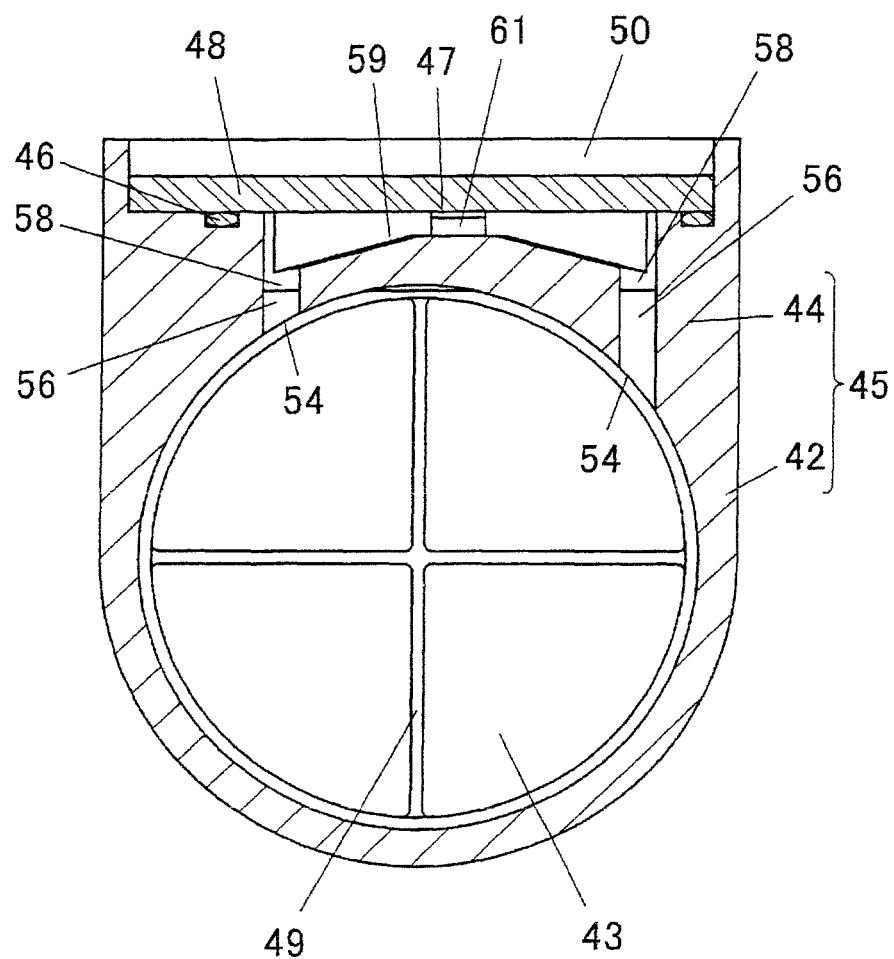
FIG. 13 is a sectional view of a flow rate measurement device according to a third embodiment of the present invention.

FIG. 13 is a sectional view of a flow rate measurement device 91 according to a third embodiment of the present invention. In this flow rate measurement device 91, left and right symmetrical surfaces of the auxiliary flow passage are displaced from left and right symmetrical surfaces of the main flow passage 43. With such a structure, since the two introduction ports 54 are provided at asymmetrical positions of the main flow passage 43, a function of averaging the flow speed of the measurement gas sampled from the introduction ports 54 is promoted.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

Description of Reference Numerals

41, 91: Flow rate measurement device
42: Main flow pipe
43: Main flow passage
44: Auxiliary flow passage block
45, 81: Base member
47: Flow rate detection element
48: Circuit substrate
49: Orifice
54: Introduction port
55: Discharge port
56: Introduction flow passage
57: Discharge flow passage
58: First auxiliary flow passage
59, 60: Second auxiliary flow passage
61: Detection flow passage
62: Measurement chamber

The invention claimed is:

1. A flow rate measurement device, comprising:
a main flow pipe having a main flow passage through which a gas passes;
an orifice for limiting a flow of the gas in the main flow passage; and
an auxiliary flow passage block provided with an auxiliary flow passage having one end communicating with a pair of introduction ports opened in the main flow passage on the upstream side of the orifice and the other end communicating with a pair of discharge ports opened in the main flow passage on the downstream side of the orifice,
wherein the auxiliary flow passage includes:
a pair of introduction flow passages having upstream ends respectively communicating with the introduction ports;
an upstream auxiliary flow passage having both ends respectively connected to downstream ends of the introduction flow passages;
a pair of discharge flow passages having downstream ends respectively communicating with the discharge ports;
a downstream auxiliary flow passage having both ends respectively connected to upstream ends of the discharge flow passages; and
a detection flow passage having an upstream end connected to the upstream auxiliary flow passage and a downstream end connected to the downstream auxiliary flow passage, the detection flow passage including a flow rate detection element, and
wherein the upstream end of the detection flow passage is positioned on the upstream side of the main flow passage relative to the both ends of the upstream auxiliary flow passage, and the downstream end of the detection flow passage is positioned on the downstream side of the main flow passage relative to the both ends of the downstream auxiliary flow passage.

2. The flow rate measurement device according to claim 1, wherein the upstream end of the detection flow passage is connected to the upstream auxiliary flow passage at a position away from the downstream ends of the introduction flow passages, and the downstream end of the detection flow passage is connected to downstream auxiliary flow passage at a position away from the upstream ends of the discharge flow passages.

3. The flow rate measurement device according to claim 2, wherein the auxiliary flow passage has a symmetric structure relative to a plane passing through center of the flow rate detection element, the plane being perpendicular to the axial direction of the main flow passage.

4. The flow rate measurement device according to claim 1, wherein a bottom surface of the upstream auxiliary flow passage is inclined so as to be lowered gradually from a point where the upstream auxiliary flow passage is connected to the detection flow passage toward the both ends respectively connected to the introduction flow passages.

5. The flow rate measurement device according to claim 4, wherein the auxiliary flow passage has a symmetric structure relative to a plane passing through center of the flow rate detection element, the plane being perpendicular to the axial direction of the main flow passage.

6. The flow rate measurement device according to claim 1, wherein a bottom surface of the downstream auxiliary flow passage is inclined so as to be lowered gradually from a point where the downstream auxiliary flow passage is connected to the detection flow passage toward the both ends respectively connected to the discharge flow passages.

7. The flow rate measurement device according to claim 1, wherein side auxiliary flow passages respectively connecting the downstream ends of the introduction flow passages and the upstream ends of the discharge flow passages are provided, and ends of bottom surfaces of the side auxiliary flow passages are respectively lower than an end of a bottom surface of the upstream auxiliary flow passage or an end of a bottom surface of the upper auxiliary flow passage.

8. The flow rate measurement device according to claim 1, wherein the auxiliary flow passage has a symmetric structure relative to a plane passing through center of the flow rate detection element, the plane being perpendicular to the axial direction of the main flow passage.

* * * * *